(12) United States Patent
Justin

(10) Patent No.: US 7,472,833 B2
(45) Date of Patent: Jan. 6, 2009

(54) INFORMATION CARD

(75) Inventor: Antony Manoj Justin, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 175 days.

(21) Appl. No.: 10/809,151

(22) Filed: Mar. 25, 2004

(65) Prior Publication Data

US 2005/0211784 A1    Sep. 29, 2005

(51) Int. Cl.
G06K 19/06 (2006.01)
(52) U.S. Cl. ...................... 235/492; 235/380
(58) Field of Classification Search ............... 235/380, 235/492, 493, 379; 705/41, 1
See application file for complete search history.

(56) References Cited

U.S. PATENT DOCUMENTS

| | | | |
|---|---|---|---|
| 4,454,414 A * | 6/1984 | Benton | 705/41 |
| 4,868,376 A * | 9/1989 | Lessin et al. | 235/492 |
| 4,887,234 A * | 12/1989 | Iijima | 711/173 |
| 5,055,662 A * | 10/1991 | Hasegawa | 235/492 |
| 5,578,808 A * | 11/1996 | Taylor | 235/380 |
| 5,884,271 A * | 3/1999 | Pitroda | 705/1 |
| 6,131,811 A | 10/2000 | Gangi | |
| 6,196,459 B1 * | 3/2001 | Goman et al. | 235/380 |
| 6,289,324 B1 | 9/2001 | Kawan | |
| 6,293,462 B1 * | 9/2001 | Gangi | 235/380 |
| 6,325,285 B1 * | 12/2001 | Baratelli | 235/380 |
| 6,601,771 B2 | 8/2003 | Charrin | |
| 6,606,605 B1 | 8/2003 | Kolls | |
| 6,641,050 B2 | 11/2003 | Kelley et al. | |
| 6,655,585 B2 | 12/2003 | Shinn | |
| 6,684,269 B2 | 1/2004 | Wagner | |
| 6,687,714 B1 | 2/2004 | Kogen et al. | |
| 2002/0104006 A1 | 8/2002 | Boate et al. | |
| 2003/0106935 A1 * | 6/2003 | Burchette, Jr. | 235/380 |
| 2005/0130728 A1 * | 6/2005 | Nguyen et al. | 463/16 |

* cited by examiner

*Primary Examiner*—Kumiko C Koyama

(57) ABSTRACT

An information card and method of use are utilized in connection with external devices and networks. One method embodiment includes storing a variety of user information including a social security number, a driver license record, and a bank account record in a memory on the card. The method further includes selectably communicating the variety of user information in a manner detectable external to the card. Additionally, the method includes selectably updating the variety of user information stored on the card based on user input.

30 Claims, 9 Drawing Sheets

INFORMATION CARD

INTRODUCTION

In today's electronic commerce there has been a proliferation in the use of various types of credit, debit, identification and other types of authorization cards. For example, an average individual is likely to carry a driver's license, several credit and/or debit cards, an identification card for access to a health club, an identification card to gain access to a place of employment and an access card to gain entry into a parking garage, among others. Furthermore, with advances in electronic commerce, smart cards are likely to replace paper and coin money resulting in an additional card for consumers to carry. Each of these cards typically incorporates a magnetic stripe or bar code to facilitate easy recognition of the card and to store various types of data. Although the use of these cards allow for easy and efficient electronic commerce, the number of such cards quickly becomes cumbersome and many individuals find carrying the large number of cards inconvenient.

Attempts have been made to use a single smart card to hold the various types of user information contained on several cards. Some attempts involve the downloading of information from the smart card provider, however, they do not allow a smart card user to control the contents of the device by adding additional information from other sources and/or editing the contents, e.g., including removing information from discontinued cards. Additionally, present devices do not allow a user to selectably communicate the new and/or modified user information to other devices external to the card, nor do the devices allow a user to selectably review the information in a manner detectable external to the card.

DETAILED DESCRIPTION

Embodiments of the present invention provide for the integration of a variety of user information including a social security number, a driver license record, and a bank account record on an information card. The information card includes a processor and a memory within the card. The information card includes an input/output (I/O) component coupled to the memory and processor. The I/O component can selectably communicate the variety of user information in a manner detectable external to the card based on input to the card. The I/O component can selectably update the variety of user information based on input to the card. In various embodiments biometric identification mechanism is provided on the card to secure the variety of user information.

Figure 1A:
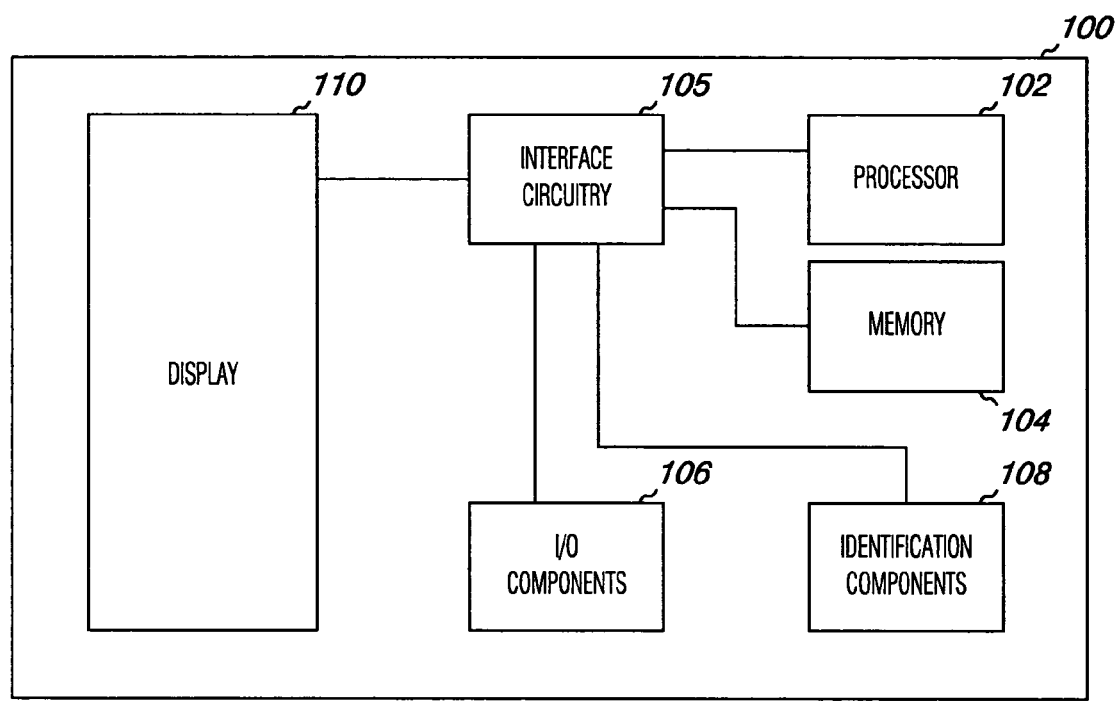
FIG. 1A illustrates an embodiment of an information card.

FIG. 1A illustrates an embodiment of an information card 100. As shown in the embodiment of FIG. 1A, the information card 100 includes a processor 102 and a memory 104 connected via interface circuitry 105. One of ordinary skill in the art will appreciate upon reading this disclosure the various types of suitable interface circuitry able to connect the processor 102 and memory 104, as well as suitable processor 102 and memory 104 resources sizeable for implementation on an information card measuring the size of a credit card or other desired card dimension. As one of ordinary skill in the art will appreciate upon reading this disclosure, in various embodiments the processor 102, memory 104, and interface circuitry 105 can be implemented as separate chipsets connected together and/or as combined components on one integrated circuit. Embodiments of the invention are not so limited.

As shown in the embodiment of FIG. 1A, the information card 100 includes an identification component 108, a display 110, and various other input/output (I/O) components, shown generally as 106, connected to the processor 102 and memory 104 components via interface circuitry 105. By way of example, and not by way of limitation, the display can include a liquid crystal display (LCD), touch panel display, thin film transistor display, or other suitable display technology provided either in color or black and white format. As will be described in more detail in connection with FIG. 2, the identification component 108 can include a hand writing sensor, an audio sensor, a finger print sensor, a blood analysis DNA sensor, a neural network sensor, an odorant sensor, and an eye sensor, among others. And, as will be described in more detail in connection with FIG. 2, the various other I/O components can include a function key, a transceiver, a data port, an audio input/output, a camera, and an information card interface (e.g., magnetic stripe, bar code, optically readable media surface, etc.).

Figure 1B:
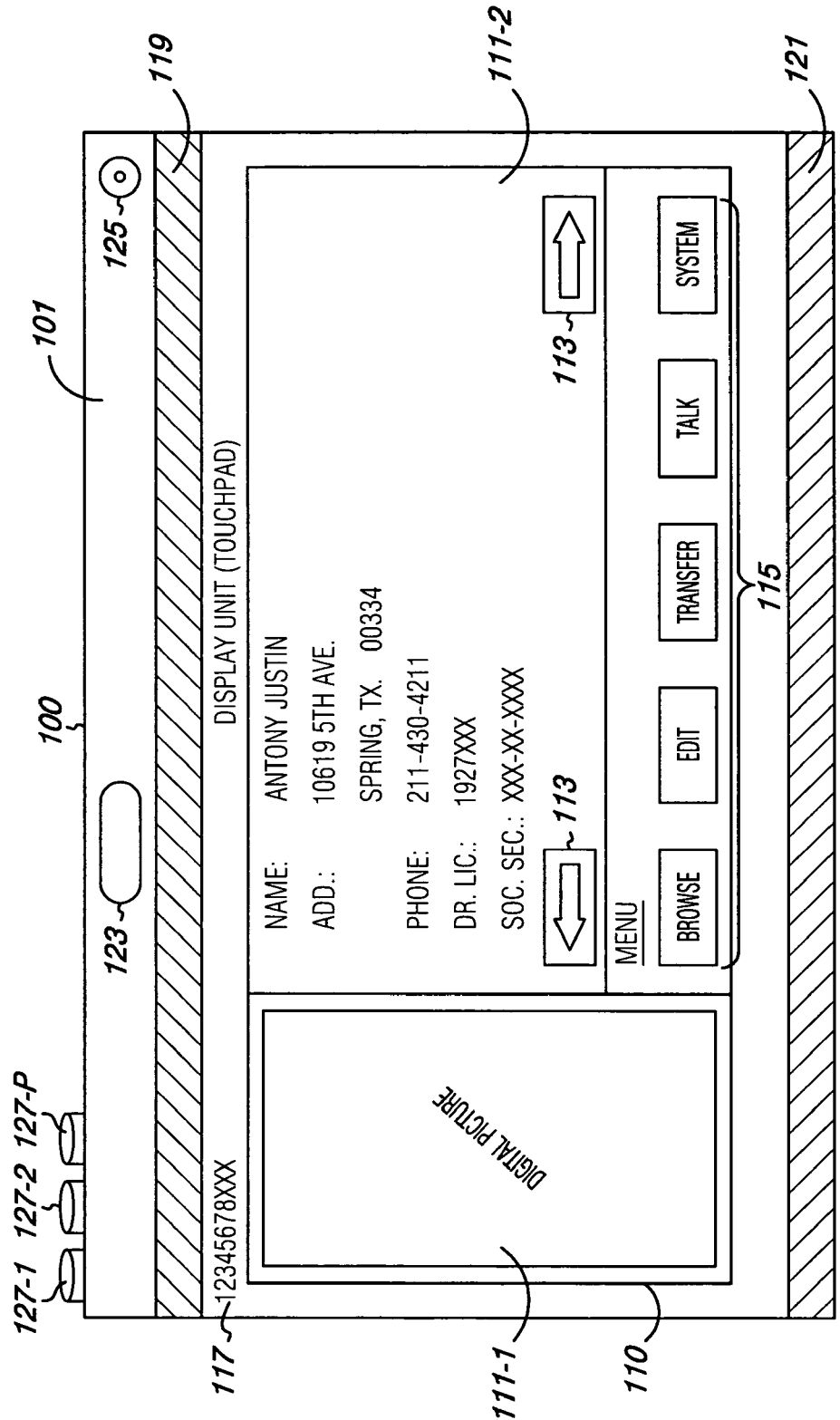
FIG. 1B illustrates another embodiment of an information card.

FIG. 1B illustrates another embodiment of an information card 100. The embodiment of FIG. 1B illustrates an embodiment showing one face or exterior surface 101 of the information card 100 as viewable by a user. The embodiment of FIG. 1B is one in which the display 110 shown in FIG. 1A is bi-furcated, shown as 111-1 and 111-2. By way of example and not by way of limitation, a first portion 111-1 of such a bi-furcated display can be used to present a digital picture. For example, the first portion 111-1 can display a digital picture of an owner of the information card 100. As shown in the embodiment of FIG. 1B, a second portion 111-2 can display additional user information including descriptive text. For example, the embodiment shown in FIG. 1B illustrates a text display of a name of an owner of the information card 100 as well as their street address, phone number, driver license number, social security number, etc. As will be explained in more detail in connection with FIGS. 2 and 3B, the first and second portions, e.g., 111-1 and 111-2, of the display 110 can be selectably system configurable to present a set of default information, e.g., a card user's photo id, name, and address, etc. Embodiments, however, are not limited to these text display examples.

As shown in the embodiment of FIG. 1B, one or more areas of the display 110 can present browsing arrows 113 to allow a user of such a touch screen display 110 to navigate among a variety of user information for presentation on the display 110. The embodiment of FIG. 1B illustrates a number of displayable function buttons 115 which a user of the touch screen display 110 can selectably contact to activate or trigger a file menu as the same are known and understood by one of ordinary skill in the art. For example, a user of the information card 100 can contact a displayable function button and a file menu can appear on the display 110 presenting a number of additional touch screen, contact selectable file options. The displayable function buttons illustrated in the embodiment of FIG. 1B include a browse button, an edit button, a transfer button, a talk button, a system button, etc.

As one example of use, the system button can trigger a file menu for presentation on the display 110 upon contact of the touch screen display 110 by a user of the information card 100. Within the file menu a user will be presented with a number of additional touch screen, contact selectable file options to configure the display 110 of the information card 100 according to various user desired settings. For example, among the selectable file options a user can select security levels, authentication/authorization protocols, and/or default displays, etc., among others as the same are known and understood to one of ordinary skill in the art. Embodiments are not limited to these examples.

The embodiment of FIG. 1B further illustrates that the information card 100 can include physically printed or imprinted text thereon such as an information card alphanumeric identifier 117 by way of example. FIG. 1B illustrates a portion of the information card 100 includes a card interface 119 for interacting with other devices external to the card 100. For example, as will be discussed in connection with FIG. 2 the card interface 119 can include a magnetic stripe, bar code, and/or optically readable media surface, etc., among others. The card interface 119 can additionally include a microphone and speaker, etc., as the same are known and understood by one of ordinary skill in the art.

The embodiment of FIG. 1B illustrates a portion of the information card 100 includes as sensor mechanism 121. The sensor mechanism 121 can include a user authorization and/or identification sensor, e.g., a biometric sensor and/or an optical sensor, among others, etc. For example, as described in more detail in connection with FIG. 2, the sensor mechanism 121 can include a hand writing sensor, an audio sensor, and biometric sensors such as a finger print sensor, a blood analysis DNA sensor, a neural network sensor, an odorant sensor, and an eye sensor, among others.

FIG. 1B illustrates that the information card 100 can include a camera unit 123. One of ordinary skill in the art will appreciate the manner in which the camera unit 123 can include a lens on the face or exterior surface of the information card 100 as part of a camera unit 123 to collect images storable as pixel data on a memory. One of ordinary skill in the art will further appreciate the manner in which such image collection technology can be embedded within integrated circuitry on the information card. By way of example and not by way of limitation, the information card 100 can include optical integrated circuit technology as is presently available and included with cell phones.

As shown in the embodiment of FIG. 1B, the information card 100 can include another optical sensor such as a light emitter (e.g., light emitting diode (LED)) and light detector (e.g., charge coupling device (CCD)) combination, for use in additional roles, e.g., illumination for visibility in darkness, authorization and identification purposes, etc., among other uses as discussed in more detail in connection with FIG. 2. FIG. 1B also illustrates that a number of additional physical buttons, shown as 127-1, 127-2, . . . , 127-P, can be provided in a manner accessible to the exterior of the information card 100 as suitable to various purposes. The designator "P" is intended to indicate the number of other information cards with which a given information card can exchange information is not limited to a particular number. For example, the physical buttons, 127-1, 127-2, . . . , 127-P, can include a power button, a button to initiate a signal to another device, an alarm/security button, a button to capture a digital image through the camera unit, etc., as the same will be known and understood by one of ordinary skill in the art.

Figure 2:
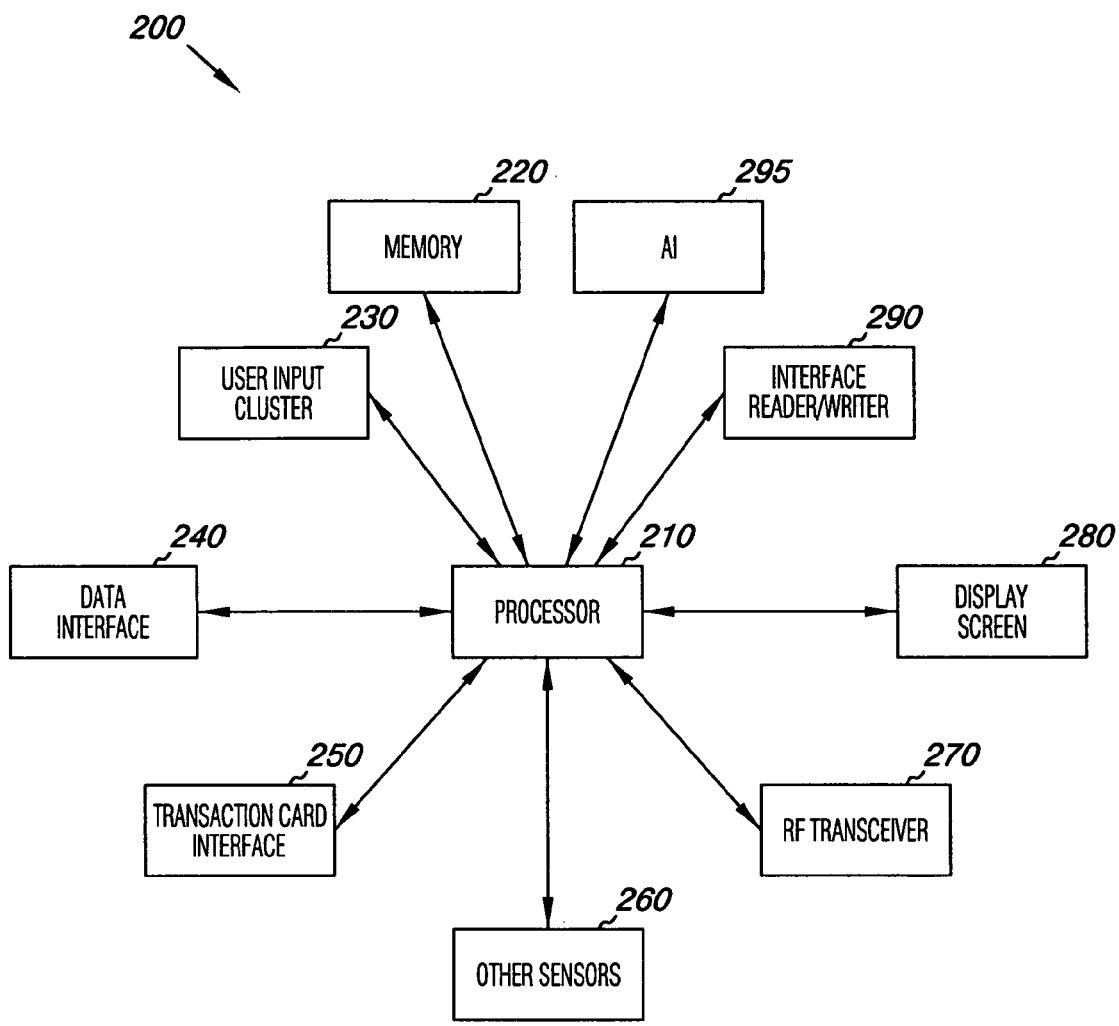
FIG. 2 is a block diagram illustrating the interaction of various electronic components in an embodiment of an information card.

FIG. 2 is a block diagram illustrating the interaction of various electronic components in an embodiment of an information card, e.g., card 100 shown in FIG. 1A. The various components of the information card 200, illustrated in the embodiment of FIG. 2, can be controlled by instructions, e.g., software and/or firmware, executed by the processor 210. Such instructions can be stored in memory 220 and/or received from sources external to the information card embodiments, e.g., such as through one or more of the I/O components mentioned in connection with FIG. 1A and as will be explained in more detail below.

As shown in FIG. 2, the processor 210 can receive and act upon input. instructions from a user input cluster 230. The user input cluster can include one or more input keys such as on a keypad provided on a face and/or accessible on an external surface of the information card. The input keys can include one or more function keys, alphanumeric keys and a toggle key to browse menu items presented on a display. As shown in the embodiment of FIG. 2, the processor 210 can exchange data with a data interface 240 provided to the card, e.g., through the interface circuitry 105 and I/O components 106 shown in FIG. 1A, or otherwise according to techniques known to one of ordinary skill in the art. The data interface 240 can include a data interface such as a serial bus (e.g., a USB port), parallel port, or other such data interface as the same are known and understood by one of ordinary skill in the art.

As shown in the embodiment of FIG. 2, the processor 210 can execute instructions to enable an information card interface 250, e.g., magnetic stripe, bar code, optically readable media surface, microphone and speaker, etc. As will be explained in more detail in connection with other components shown in FIG. 2, the processor 210 can execute instructions in conjunction with signals and/or other instruction sets received from such components as an identification sensor, e.g., card authorization sensor (which is discussed in conjunction with other sensors 260), and/or an information card interface reader/writer 290, etc.

The embodiment of FIG. 2 illustrates that the processor 210 can execute instructions to interact with other sensors 260. By way of example, and not by way of limitation, other sensors 260 can include information card user identification sensors including a hand writing sensor, an audio sensor, and biometric sensors such as a finger print sensor, a blood analysis DNA sensor, a neural network sensor, an odorant sensor, and an eye sensor, among others. Various biometric identification sensors and techniques are known and commercially available. According to various embodiments of the present invention, however, such biometric identification sensors are implemented in an information card embodiment together with program instructions which can be executed by the processor to enable the information card interface 250, and can execute instructions to enable another function in connection with the information card, e.g., to control access to a variety of user information stored in the memory 220 of the information card.

For example, a user may scribe a writing to a touch sensitive display screen (e.g., 280) which can be registered by executing instructions implemented with a hand writing sensor and compared against a known writing sample of an authorized card user. One of ordinary skill in the art will appreciate the manner in which a user may scribe a writing to a touch sensitive display such as is presently available on personal digital assistants (PDAs). An audio sensor may be activated by a function key in the user input cluster 230 and record a voice sample which can be registered by executing instructions implemented with the audio sensor and compared against a known voice pattern of an authorized card user. One of ordinary skill in the art will appreciate the manner in which a voice sample can be recorded and can be registered by executing instructions implemented with the audio sensor and compared against a known voice pattern, e.g., using voice recognition software and/or firmware. A finger print sensor may be activated by application of a finger to a pad, e.g., a pad sensing the dielectric properties of the skin and/or optically reading the print, to detect a finger print which can be registered by executing instructions implemented with the finger print sensor and compared against a known finger print of an authorized card user. A blood analysis DNA sensor may be activated by application of blood droplet to a DNA sensor pad, as the same are known and understood by one of ordinary skill in the art, to register a DNA type in connection with executing instructions implemented by the blood analysis DNA sensor and compare the registered DNA type against a known DNA type of an authorized card user. A neural network sensor may be activated by application of a finger to a neural network sensor pad, as the same are known and understood by one of ordinary skill in the art, to detect a human nervous system stimulus which can be registered by executing instructions implemented with the neural network sensor and compare the stimulus reading against a known nervous system stimulus reading of an authorized card user. An odorant sensor may be activated by a function key in the user input cluster 230 and implement filters to register a scent registered by executing instructions implemented with the odorant sensor and compare the registered scent against a known scent of an authorized card user. For example, commercial odorant sensor technology is known and implemented in fire security system technologies, among others. An eye sensor may be activated by a function key in the user input cluster 230 and execute instructions to emit infra-red (IR) light toward and eye of a user and detect reflected IR light to register a iris pattern and compare the registered iris pattern against a known iris pattern of an authorized card user, as the same are known and understood by one of ordinary skill in the art. Embodiments of the invention, however, are not limited to the biometric identification sensor examples listed above.

Further, by way of example and not by way of limitation, the other sensors 260 can include biometric sensors, e.g., a thermometer/temperature sensor, a sugar level sensor, a heart rate sensor, a blood pressure sensor, etc. Such sensor technology is commercially available as known to one of ordinary skill in the art. One of ordinary skill in the art will appreciate upon reading this disclosure the manner in which the processor 210 can execute instructions to control the operation of such biometric sensors 260 when included with the information card 200. One of ordinary skill in the art will further appreciate upon reading this disclosure the manner in which such biometric sensors 260 can be sized to be included on the information card 200 and will recognize the manner in which program embodiments can execute instructions to store biometric data detected by the biometric sensors 260 in memory 220. Embodiments are not limited to the biometric sensor examples listed above.

Additionally, the other sensors 260 can include photo-optic sensors for capturing digital images as the same are known and understood by one of ordinary skill in the art. Again, program embodiments can execute instructions, e.g., based on user input instructions to the user input cluster 230, to control the operation of the photo-optic sensors for capturing a digital image and to store the images in memory 220. Another example of the other types of sensors includes artificial intelligence (AI) circuitry 295 which is specifically illustrated in the embodiment of FIG. 2. One of ordinary skill in the art will appreciate the use and application of AI circuitry 295 which can be implemented with firmware and/or software. For example, AI circuitry 295 can be implemented in connection with microphone described above to record, register, and compare voice patterns of an information card 100 user as against stored voice or speech patterns as part of an added security and/or authentication/authorization measure. One of ordinary skill in the art will appreciate the manner in which AI circuitry 295 and firmware and/or software can be implemented to record a user's voice pattern and compare the voice pattern against stored voice or speech patterns. Similarly, AI circuitry 295 can be implemented with a microphone and other I/O components described above to record, register, and compare other activities of daily living (ADL), e.g., activities a user generally performs during particular periods of the day, and/or bio-metric patterns, e.g., heart rate, blood pressure, sugar level, etc., as the same are known by one of ordinary skill in the art. One of ordinary skill in the art will appreciate the manner in which AI circuitry 295 and firmware and/or software can be implemented to record and compare a user's ADL and/or bio-metric patterns against stored ADL and bio-metric information for a particular user. The recordation and comparison of a user's ADL and/or bio-metric patterns can be used as part of an added security and/or authentication/authorization measure. As explained in connection with FIG. 2 and further in connection with FIG. 3B, a selection can be made based on user input to choose instances of and levels of use of the ADL and/or bio-metric patterns as an added security and/or authentication/authorization measure.

As shown in the embodiment of FIG. 2, the processor 210 can execute instructions to control an RF transceiver 270 as the same are known and understood by one of ordinary skill in the art. For example, program embodiments can execute instructions on the information card based on selectable user input, e.g., provided to the user input cluster or otherwise, to activate RF transmission in a particular frequency range of certain user information. By way of example, and not by way of limitation, the selectable user input may activate RF transmission of certain user information in an IR frequency range, or cordless telephone frequency range, an 802.11 wireless frequency standard range, a Bluetooth standard frequency range, and/or microwave frequency range as the same are known, among others in order to transmit certain user information in a manner which is detectable by another device having a suitable receiver configured to the particular frequency range according to a particular network environment. In various embodiments, the RF transceiver 270 can further include a radio frequency identification (RFID) chip component as the same are known and understood by one of ordinary skill in the art. RFID transponders read and write digital data wirelessly without internal power, drawing power from the radio frequency wave used for data communication. Most common RFID tags use IC chips having only contact-less radio frequency interfaces. In such embodiments, the RFID can include a dual interface RFID having a contact interface and a contact-less or wireless interface. The embodiments, however, are not so limited. The RF transceiver 270 is operable to communicate RF signals 125 with a remote terminal (discussed in connection with FIG. 4). By way of example and not by way of limitation, a remote terminal can include an access point (AP) in a packet-switched Internet protocol (IP) environment or a base station such as in circuit-switch cellular network environment, among other remote terminal devices as the same are known and understood to one of ordinary skill in the art.

As shown in the embodiment of FIG. 2, the processor 210 can execute instructions to interact with a display screen 280 on the information card. As mentioned above, the display screen may include a touch sensitive display screen such that the input can be provided directly to the display screen and converted to instructions which can be received by and operated on by the processor 210. Touch screen display operation and providing input instructions thereto is known and understood to one of ordinary skill in the art. According to various embodiments, program embodiments can execute instructions on the information card based on selectable user input, e.g., provided to the user input cluster 230 or otherwise, to display particular user information on the display 280. Additionally, program embodiments can execute instructions on the information card based input user selectable input information provided to the touch sensitive screen, provided to the user input cluster or otherwise, to modify particular user information, e.g., to update, delete, and/or edit particular user information. As one of ordinary skill in the art will appreciate upon reading this disclosure, such modifications can be stored in memory 220 and/or transmitted external to the information card 200 through the data interface 240, the information card interface 250, and/or RF transceiver 270 based upon selected program embodiments executing according to user input, e.g., user input to a touch screen 280 or user input cluster 230.

As shown in the embodiment of FIG. 2, the processor 210 can execute instructions to control an information card interface reader/writer 290. For example, the information card interface reader/writer 290 can include a magnetic stripe reader/writer, an optical medium reader/writer, etc., as the same will be known and understood by one of ordinary skill in the art. That is, program embodiments can be executed based on selectable user input, as described above, to enable the information card interface reader/writer to encode, e.g., magnetically polarize a magnetic stripe, optically encode and/or read an optical medium (e.g., on the information card interface 250), as the same is known and understood to one of ordinary skill in the art, with certain user information. As one of ordinary skill in the art will appreciate upon reading this disclosure, the processor 210 can additionally execute program instructions to clear such user information from the magnetic stripe, optical medium, etc., and/or selectably update the magnetic stripe, optical medium, etc., with other particular user information as suitable to a given use of the information card 200.

Figure 3A:
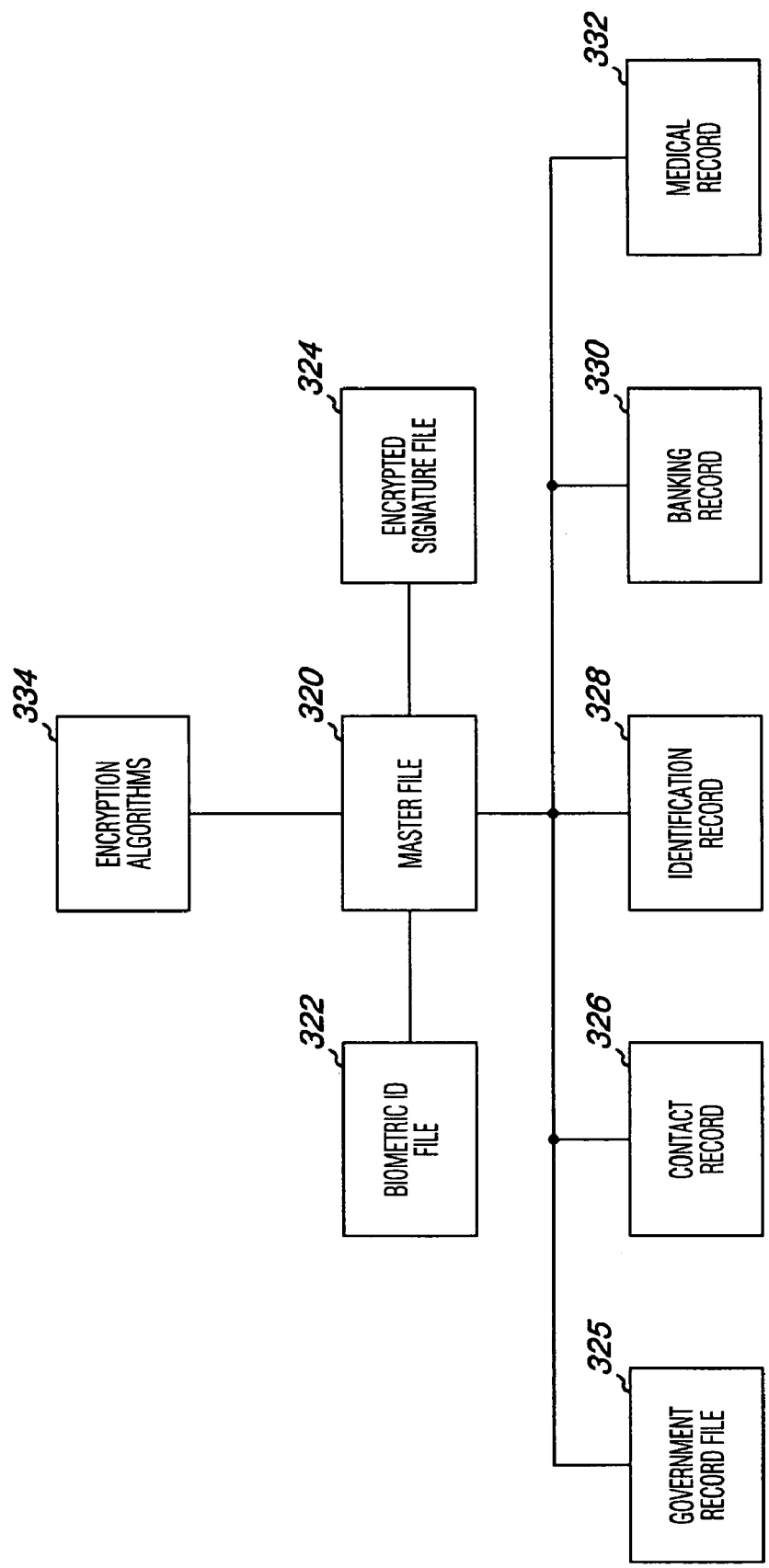
FIG. 3A is a block diagram illustrating various instruction sets and information files accessible in an embodiment of an information card.

FIG. 3A is a block diagram illustrating various instruction sets in an embodiment of an information card. As shown in the embodiment of FIG. 3A, portions of program embodiments can be stored in the information card, e.g., in memory shown as 220 in FIG. 2 or 104 in FIG. 1A, and can serve as part of a master file 320. In various embodiments, the master file 320 program embodiments are executed by the processor, e.g., 210 in FIG. 2 or 102 in FIG. 1A, to control interaction with various user information (as described in more detail below) stored in the information card. For example, the master file program embodiments execute instructions to act upon and provide response to user input, e.g., provided to the user input cluster 230 in FIG. 2, to act upon and provide response to information received on the data interface 240, to act upon and provide response to information received on the information card interface 250, to act upon and provide response to information received by the other sensors 260, the RF transceiver 270, on the display screen 280, the information card interface reader/writer 290, etc.

As shown in the embodiment of FIG. 3A, the master file 320 program embodiments can execute instructions to execute with a variety of encryption algorithms 334 as the same are known and understood by one of ordinary skill in the art, e.g., asymmetric cryptography using public key infrastructure, etc. Additionally, the master file 320 program embodiments can execute instructions to interact with a biometric identification component 322 on the information card as described above in connection with FIG. 2. Likewise, the master file 320 program embodiments can execute instructions to interact with one or more encrypted signature files 324 as the same are known and understood by one of ordinary skill in the art, e.g., digital signatures and the like.

The program embodiments can execute to store a variety of user information on the information card in different files. As shown in the embodiment FIG. 2, the variety of user information includes a government record file 325, a contact record file 326, an identification record file 328, a banking record file 330, and a medical record file 332. Embodiments of the invention, however, are not limited to these examples or to the particular file grouping of the variety of user information shown in FIG. 3A. As described in more detail in connection with FIG. 5 below, the program embodiments can execute instructions to selectively access and interact with the variety of user information contained in the government record file 325, the contact record file 326, the identification record file 328, the banking record file 330, and the medical record file 332. That is, as described above, program embodiments can execute instructions in connection with the master file program embodiments to act upon and provide response to user input whether provided to the user input cluster 230 in FIG. 2, the data interface 240, the information card interface 250, the other sensors 260, the RF transceiver 270, the display screen 280, and/or the information card interface reader/writer 290, etc. As described in more detail in connection with FIG. 5, the program embodiments can execute instructions based on selectable user input to retrieve, modify, update, and/or communicate external to the information card the variety of user information from among the different files.

Figure 3B:
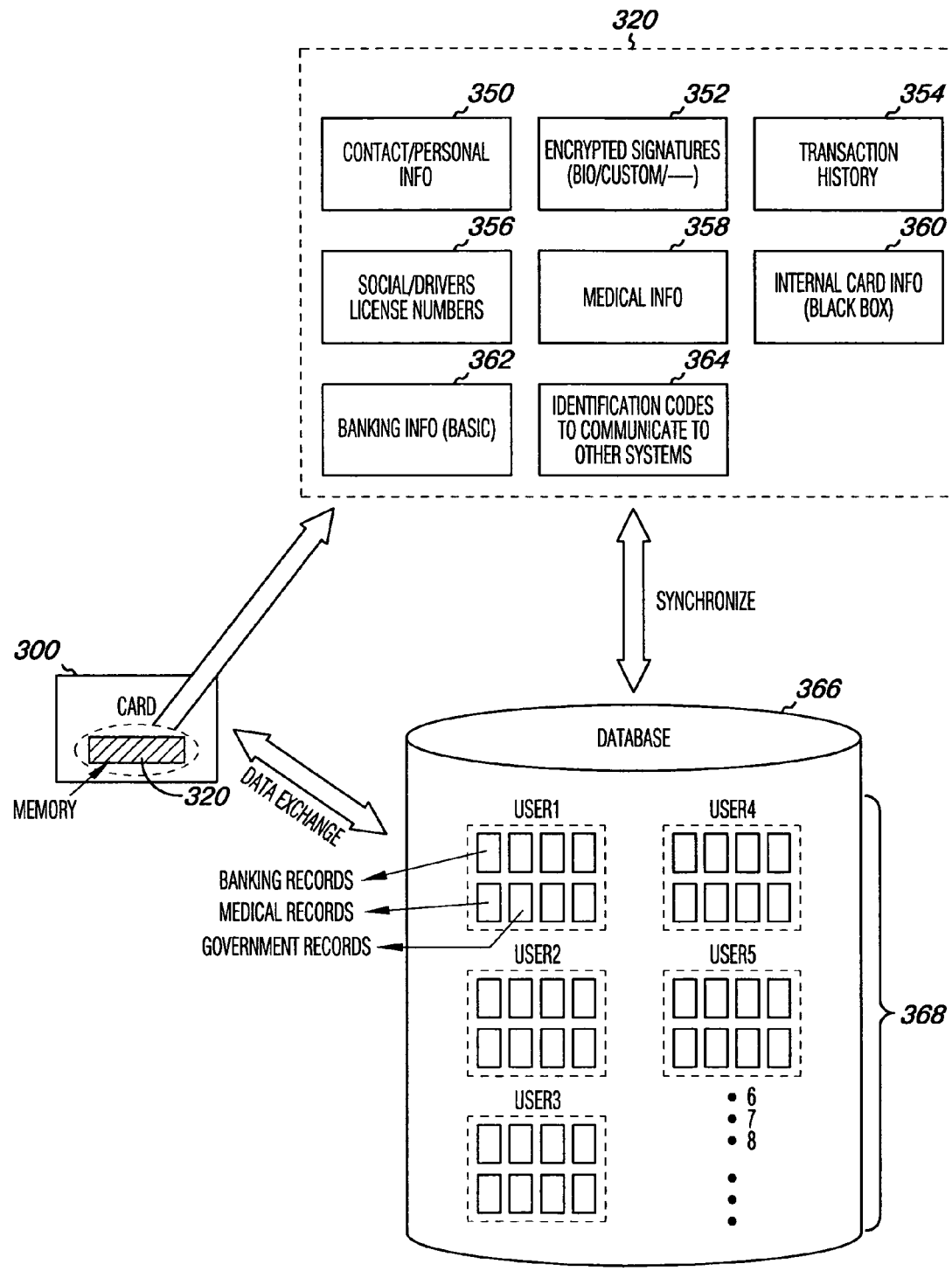
FIG. 3B is another block diagram illustrating various instruction sets and information files accessible in an embodiment of an information card.

FIG. 3B is another block diagram illustrating various instruction sets and information files accessible in an embodiment of an information card. As shown in the embodiment of FIG. 3B, an information card 300 includes a memory 320 to provide a local store for a variety of user information on the card 300 itself. There are many forms of computer readable medium, including Flash memory, RAM, ROM, DDRAM, magnetic medium, optically read medium, and the like, which can be used to provide a local store for the variety of user information. As mentioned in connection with FIG. 1B a user can, through input instructions to a touch screen display on the information card or otherwise, trigger a file menu for selecting among various file options and information card configurations, including security levels, authentication/authorization protocols, default displays, etc., as well as which items among a variety of available user information to maintain at one particular point in time or another on the local memory 320 of the information card 300.

In the embodiment of FIG. 3B, the local memory 320 on the information card 300 is illustrated as including contact and personal information 350, encrypted signatures, bio-metric, and/or custom information, etc., 352, transaction history information 354, social security and driver license information 356, medical information 358, internal card information 360, banking information 362, and identification codes information 364. Embodiments, however, are not limited to these examples.

As one of ordinary skill in the art will appreciate the contact and personal information 350 can include phone numbers, addresses, contact names, to-do lists, etc., much as the same are available today on personal digital assistants (PDAs). The encrypted signatures, bio-metric, and/or custom information, etc., 352, can include asymmetric cryptography data using public key infrastructure, biometric identification data, e.g., heart rate data according to various levels of activity, blood pressure, sugar level, etc., and encrypted signature data, e.g., digital signatures and the like. The transaction history information 354 can include a history of the information exchanges and/or presentations conducted using the information card 300 over a selectable period of time. For example, a user can, through input instructions to a touch screen display on the information card 300 or otherwise, select that all information exchanges and/or presentations conducted using the information card 300 be stored in local memory 320 for a period of time, e.g., hours, days, weeks, etc., as suited to or appropriate for the amount of memory resources available to the card 300 and in consideration of the information a user wishes to maintain locally on the card 300 along with the other various pieces of user information.

Examples of the social security and driver license information 356, medical information 358, have been described above and should be apparent to one of ordinary skill in the art upon reading this disclosure. As with the above pieces, a user can, through input instructions to a touch screen display on the information card 300 or otherwise, select the volume and detail for the information stored in local memory 320 as suited to or appropriate for the amount of memory resources available to the card 300 and in consideration of the information a user wishes to maintain locally on the card 300 along with the other various pieces of user information. For example, a user may choose to maintain medical information relating to donor status, blood type, heart condition information, allergy information, etc., in the local memory 320.

The internal card information 360 can include a local store of card 300 internal system information and/or settings such as frequency of use, default settings, issue date of the card, and/or card activity leading up to any type of error or disruption in the operation of the card 300, etc., much like internal voice recording systems and "black box" type data as used in commercial aviation. Again, embodiments are not limited to these examples. The banking information 362 has been described above and should be apparent to one of ordinary skill in the art upon reading this disclosure. As with the above pieces, a user can select the volume and detail for the information stored in local memory 320 as suited to or appropriate for the amount of memory resources available to the card 300 and in consideration of the information a user wishes to maintain locally on the card 300. For example, a user may choose to maintain various banking account numbers, passwords and/or identifiers in the local memory 320. Additionally, the identification codes information 364 can include information for data exchange with other systems, e.g., communication protocols and/or access codes, as will be explained in more detail in connection with FIGS. 4A-4C.

As shown in the embodiment of FIG. 3B, and as will be explained in more detail in connection with FIGS. 4A-4C, the local memory 320 on the information card 300 can conduct a data exchange with a device 366 external to card 300 such as a server, database, etc. By way of example and not by way of limitation, the data exchange can be with a master database in a particular location. The embodiment of FIG. 3B illustrates the server/database 366 example in which a number of different user information repositories 368 may reside. As one of ordinary skill in the art will appreciate upon reading this disclosure, each particular user repository can include a volume of additional user information per particular user among the variety of types of user information described above, e.g., banking records, medical records, government records, etc., among others.

Further, as shown in the embodiment of FIG. 3B, the server/database 366 can include protocols and instructions, as the same are known among computing and communication data exchange networks, e.g., LANs, WANs, cellular networks, etc., to synchronize and update information between the local memory 320 on a particular user's information card 300 and the particular user's repository 368 in the server database. As mentioned above, since a user can select a period of time, e.g., hours, days, weeks, etc., and can select a volume and a level of detail for the information stored in local memory 320 as suited to or appropriate for the amount of memory resources available to the card 300 and in consideration of the information a user wishes to maintain locally on the card 300, these instructions can execute to synchronize the variety of user information between the local memory 320 on a particular user's information card 300 and the particular user's repository 368 in the server database accordingly.

Figure 4A:
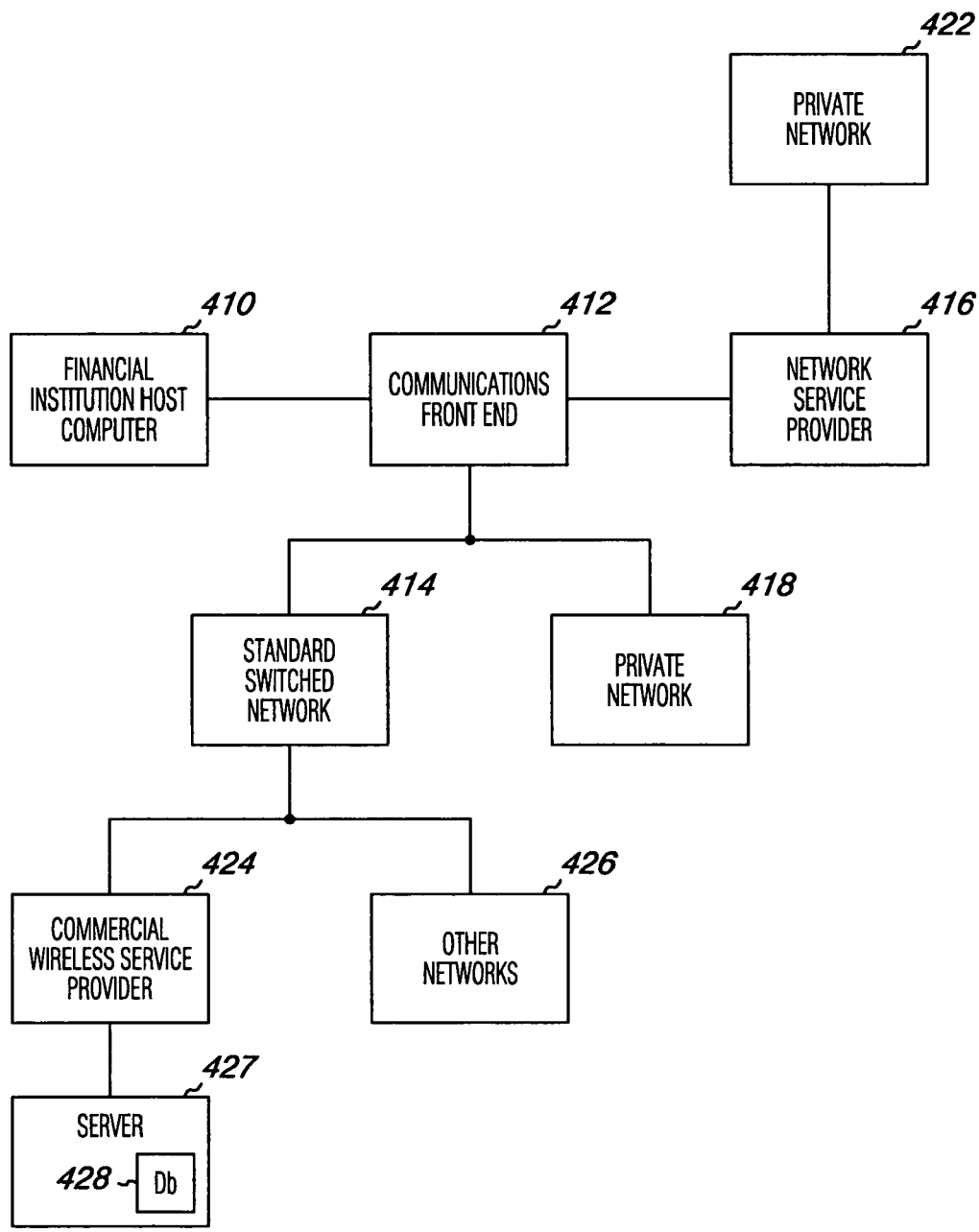
FIG. 4A illustrates different networks with which various embodiments of the information card can communicate.

FIG. 4A illustrates different networks with which various embodiments of the information card can communicate. As shown in the embodiment of FIG. 4A, an I/O component on the information card, e.g., I/O component 106 in FIG. 1A or the data interface 240, the information card interface 250, the RF transceiver 270, etc., shown in FIG. 2, can transmit and receive information, including the variety of user information described above, with a communications front end 412, e.g., network link, to a variety of network connections. As one of ordinary skill in the art will appreciate upon reading this disclosure the communications front end 412 can include a USB connection to a USB serial port, can include an information card interface reader (e.g., a magnetic stripe card reader, an optical medium reader, etc.), can include an access point in a Wi-Fi (wireless fidelity) network, and can include an RF base station, etc. Embodiments of the invention, however, are not limited to these examples.

As shown in the embodiment of FIG. 4A, the communications front end 412 can provide network connectivity among and between various network types. For example, as shown in the embodiment of FIG. 4A, the communications front end 412 can connect to a financial institution host computer 410, a standard switched network 414 such as the public switched telephone network (PSTN), a network service provider 416 such as an internet service provider (ISP) using TCP/IP, and a private network such as a local area network (LAN) and/or wide area network (WAN) used by a company or individual. The various network types can further include wireless voice and data networks using American national standards institute (ANSI) (e.g., code division multiple access (CDMA) or time division multiple access (TDMA)) and/or global system for mobile (GSM) technologies, short messaging service (SMS) networks, global positioning systems (GPS), text messaging networks, two way radio (e.g., push to talk networks), etc., among others as the same will be known and understood by one of ordinary skill in the art.

As shown in the embodiment of FIG. 4A, the network service provider 416 can further communicate information among and between another private network 422 and/or other public network (not shown). Further, the standard switched network 414 can communicate with a commercial wireless service provider 424 in addition to providing connectivity to other networks 426. Additionally, the communications front end 412 can provide connectivity to various computing devices such as, but not limited to, point of sale terminals, dumb terminals and databases. Embodiments of the invention, however, are not limited to the example networks or to the particular network connection arrangement shown in FIG. 4A.

Further, the various networks various network connections illustrated in FIG. 4A can provide connectivity to a central server account location 427, e.g., through the commercial wireless service provider 424 or other network connection, which can include a database 428 containing a user account with access to additional volumes of user information which may be too voluminous to store permanently on the information card. Thus, as one of ordinary skill in the art will appreciate upon reading this disclosure, program embodiments described herein can execute in connection with the various I/O components, e.g., 106 in FIG. 1A and described in more detail in FIG. 2, to access, retrieve to the information card, transmit from the information card, and update to the information card and/or locale or remote database the user information.

In connection with the various I/O components, e.g., 106 in FIG. 1A and those shown in FIG. 2, program embodiments can execute to transmit and receive alerts, pages, and/or real time voice in exchange with another device external to the information card. Thus, by way of example and not by way of limitation, the program embodiments can execute instructions, e.g., based on user input instructions as described above, to employ a biometric sensor (as described above) to record a health measurement, e.g., temperature, blood pressure, sugar level, etc., and to transmit this information to another device external to the information card, e.g., an attending physicians email account, facsimile number, voicemail box, and/or similar information card in the possession of the attending physician to provide the attending physician with health information pertaining to the information card user. Similarly, an attending physician can transmit diagnoses, health care instructions, and/or or prescription authorizations back through the various networks described in connection with FIG. 4A to the information card of the user. In one example, a prescription order can be returned to the user's information card from which the user could connect with a printing device over a network connection, as described in connection with FIG. 4A, to print out the attending physician's prescription. Likewise, the attending physician can send the prescription request to a particular pharmacy and notify the user via an alert to the user's information card.

As one of ordinary skill in the art will appreciate upon reading this disclosure the alert capability is not limited to the example given above. Program embodiments can execute instructions to communicate a variety of alerts to and from the information card described herein. That is, the alerts can include news media and weather alerts, meeting alerts, email alerts, payment and billing alert notifications, reminder alerts, etc., including audio alerts, among others. Embodiments of the invention are not limited to the examples described herein.

Figure 4B:
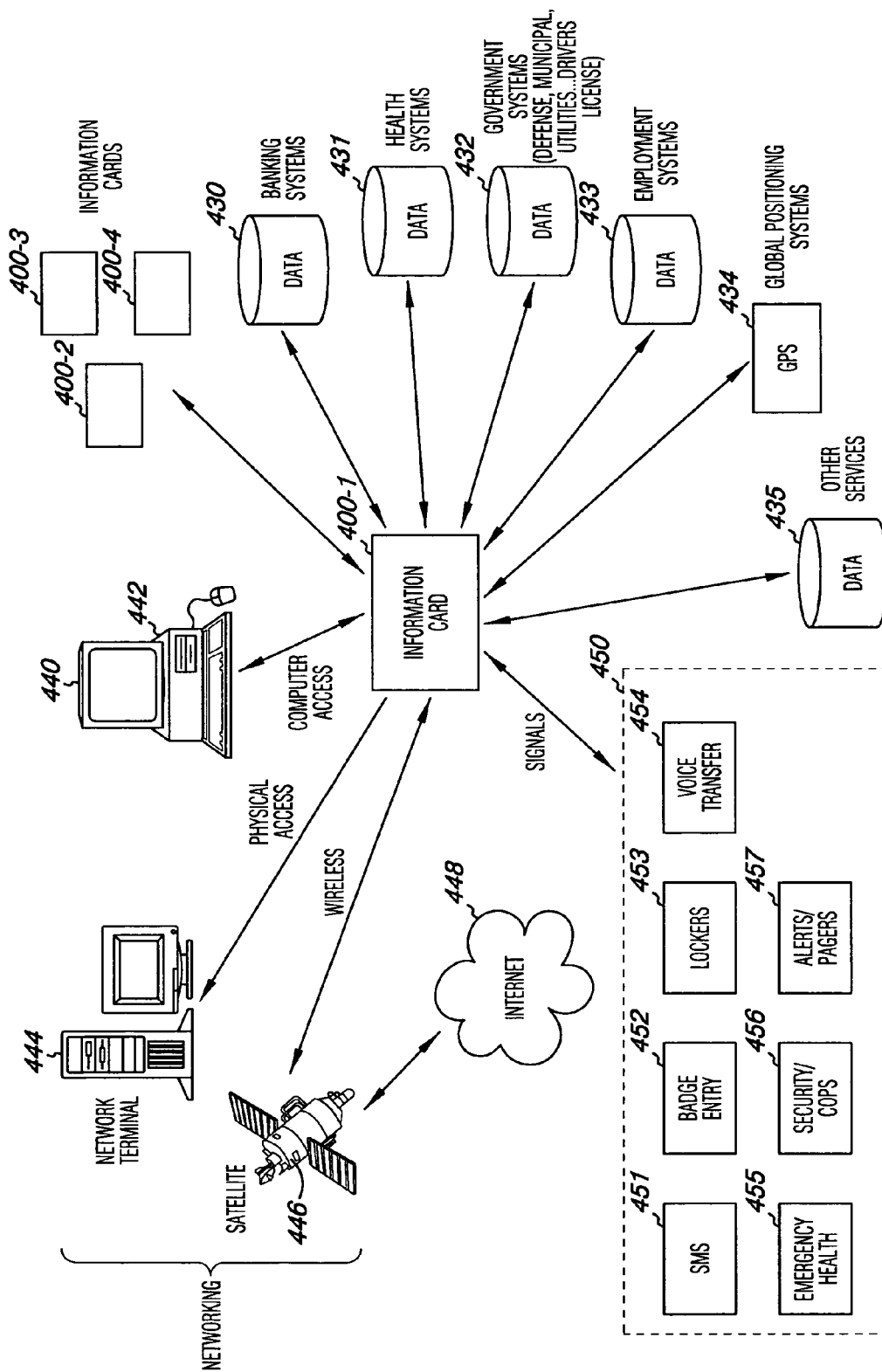
FIG. 4B is another illustration of various networks with which various embodiments of the information card can communicate.

FIG. 4B is another illustration of various networks with which various embodiments of the information card can communicate. As shown in the embodiment of FIG. 4B a given information card, e.g., 400-1, can exchange information with a number of devices external to the information card 400-1. For example, as illustrated in FIG. 4B, the information card 400-1 can exchange information with a number of other information cards, e.g., 400-2, 400-3, . . . , 400-P, etc. The designator "P" is intended to indicate the number of other information cards with which a given information card can exchange information is not limited to a particular number. As one of ordinary skill in the art will appreciate from having read this disclosure the information card 400-1 can communicate with and exchange information with the number of other information cards, 400-2, 400-3, . . . , 400-P, using a variety of available wired and/or wireless technologies, e.g., IR, cellular networks, Bluetooth, Wi-Fi, etc. Embodiments are not limited to these examples.

As shown in the embodiment of FIG. 4B a particular information card 400-1 can similarly communicate with and exchange information, e.g., using technologies as described above, with a number of external databases. For example, the embodiment of FIG. 4B illustrates the information card 400-1 in communication with and able to exchange information with a banking system database 430, a health systems database 431, a government systems database 432, e.g., a defense, municipal, utilities, motor vehicle, courthouse, or other such governmental database, an employment database 433, e.g., such as a job search database, employee, and/or HR database of a user's employer according to access privileges. The embodiment of FIG. 4B additionally illustrates the information card 400-1 in communication with and exchanging information with a global positioning system (GPS) as the same are known and understood by one of ordinary skill in the art. For example, the information card 400-1 can communicate and exchange cartographic, topographic, and/or navigation information with GPS system. The embodiment of FIG. 4B also illustrates that the information card 400-1 can communicate with and exchange information with databases for other service types, shown as 435, using one or more different types of available communication mediums, as one of ordinary skill in the art will appreciate upon reading this disclosure.

The embodiment of FIG. 4B illustrates that the information card 400-1 can be used, in connection with its various I/O components described herein, for computer access 440. By way of example and not by way of limitation, a particular computing device 440, standing alone and/or further connected to a network, e.g., a LAN, WAN, etc., can be provided with a card drive 442 which is sized to receive the information card 400-1. One of ordinary skill in the art will further understand upon reading this disclosure the manner in which a card drive 442 may be provided with an appropriate reading/writing mechanism, e.g., optical, magnetic, etc., to interact with a corresponding type of I/O component on the information card 400-1.

The embodiment of FIG. 4B illustrates that the information card 400-1 can similarly be inserted to a network terminal 444 having a card drive 442 which is sized to receive the information card 400-1 and which is provided with an appropriate reading/writing mechanism, e.g., optical, magnetic, etc., to interact with a corresponding type of I/O component on the information card 400-1 as described above. By way of example and not by way of limitation, the network terminal 444 can include a network terminal in a shopping mall, airport, grocery store, retail outlet, and include an automatic teller machine (ATM) which has been adapted to include such a card drive 442, etc., among others. Embodiments are not limited to these examples.

The embodiment of FIG. 4B illustrates that the information card 400-1 can communicate and exchange information over a wireless network with a satellite 446 and that this medium, and/or others as the same have been described herein, can be used to provide the information card 400-1 with access to the internet 448 or other content medium. For example, a user can provide input to the information card 400-1, using touch screen input or otherwise, to gain access to the worldwide web. As one of ordinary skill in the art will appreciate, a user can thus employ the information card to perform on-line shopping, browsing, check stock quotes. And, further as one of ordinary skill in the art will appreciate from reading this disclosure the user can conduct financial transactions and fund transfers using a variety of available wired and/or wireless technologies, e.g., IR, cellular networks, Bluetooth, Wi-Fi, etc.

The embodiment of FIG. 4B additionally illustrates that the information card 400-1 can communicate and exchange signal information a number of other external devices using various communication exchange mediums, e.g., RFID, IR, Bluetooth, Wi-Fi, etc., among others. The embodiment of FIG. 4B illustrates the information card 400-1 communicating and exchanging signal information with an short messaging service (SMS) 451, a badge entry check point 452, a locker 453, a voice transfer point 454, an emergency health access point 455, a security or law enforcement access point 456, and a pager device 457. Embodiments, however, are not limited to these examples.

By way of example and not by way of limitation, the information card 400-1 can be worn as apparel by a user, e.g., clipped to clothing, around the neck, and/or around the wrist, etc., among others. Thus, according to the various communication technologies mentioned herein, a bearer of the information card 400-1 can engage external devices upon entering a range of reception of another external devices. For example, as the information card 400-1 approaches a badge entry check point 452 a user can be authorized to enter a facility. As another example, as the information card 400-1 approaches a particular locker 453, e.g., appropriately corresponding to the information card 400-1, a user may be provided with access to that particular locker. Similarly, as the information card 400-1 approaches an emergency health access point 455 and/or a security or law enforcement access point 456, e.g., that is able to communicate with the information card 400-1, a user may be provided with access to that particular location.

As the reader will appreciate, as the information card 400-1 approaches a voice transfer point 454 and/or pager device access point 457 or otherwise for a particular type of network that is able to communicate with the information card 400-1 an exchange or transfer of information can occur. Additionally, as one of ordinary skill in the art will appreciate upon reading this disclosure, a similar communication and information exchange can occur between household appliances, rooms, etc., as illustrated in connection with FIG. 4C.

Figure 4C:
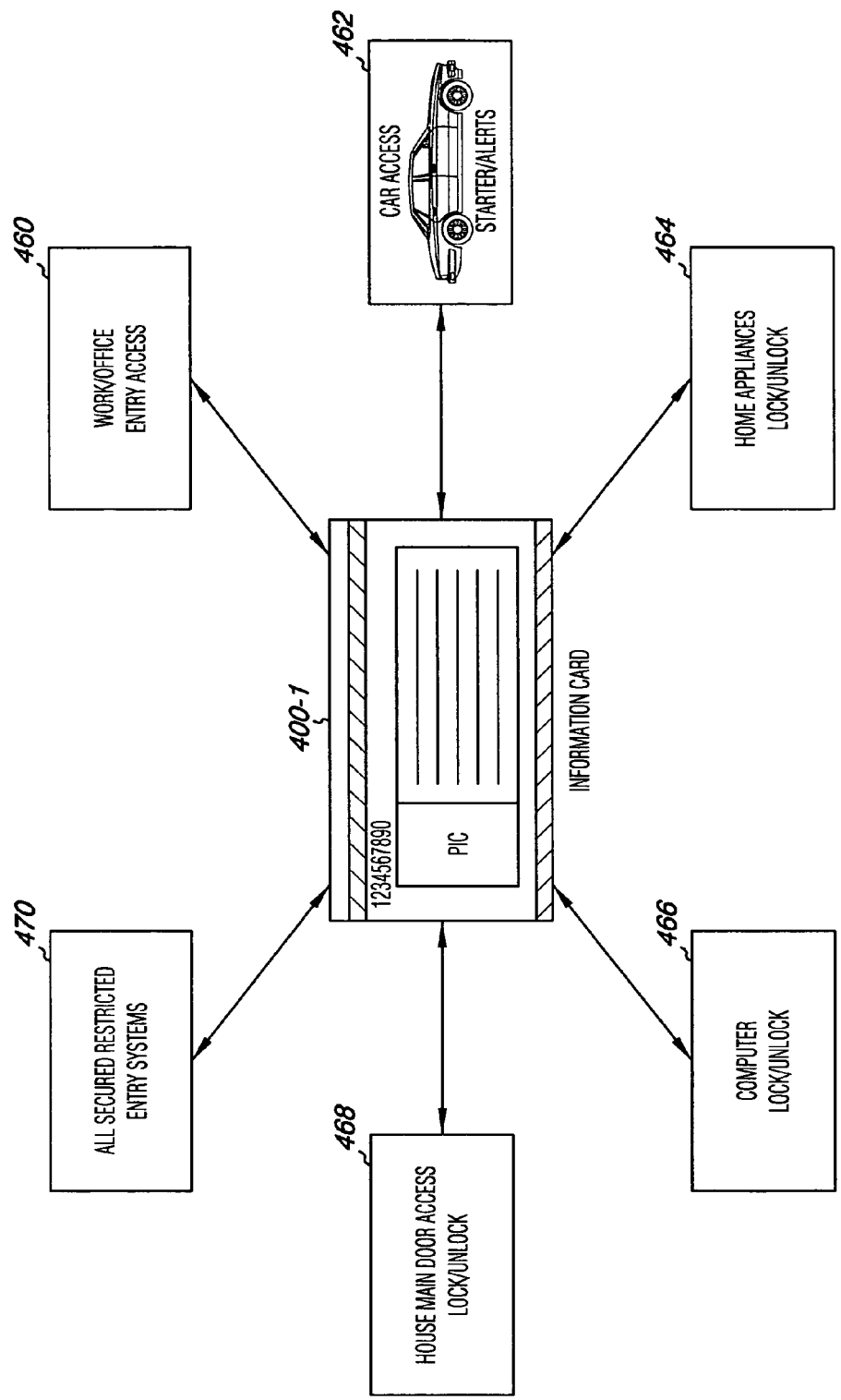
FIG. 4C illustrates various networks with which various embodiments of the information card can communicate.

FIG. 4C illustrates various networks with which various embodiments of the information card can communicate. FIG. 4C illustrates that an information card, e.g., 400-1, as the same has been described herein, can be used to provide entry/access to a work place or particular office 460, a vehicle, including starting an ignition 462, a residence, including unlocking rooms, cabinets 468, and/or turning on/off intelligent appliances 464, disabling and/or enabling electronic systems, including locking and unlocking computers 466, and/or other security entry systems 470 designed to communicate with the information card 400-1.

As one of ordinary skill in the art will understand upon reading this disclosure, embodiments of the invention can be performed by software and/or firmware, application modules, e.g., computer executable instructions, operable on the systems and devices shown herein or otherwise. The invention, however, is not limited to any particular operating environment or to software and/or firmware written in a particular programming language. Software, firmware, and application modules, suitable for carrying out embodiments of the present invention, can be resident in one or more devices or locations or in several locations in a distributed network.

One of ordinary skill in the art will appreciate that various components and/or devices described herein can include a computer readable medium, on which a set of computer executable instructions can reside. There are many forms of computer readable medium, including Flash memory, RAM, ROM, DDRAM, magnetic medium, optically read medium, and the like, which can be included in one and/or all of the various devices, components, and systems mentioned.

Unless explicitly stated, the method embodiments described herein are not constrained to a particular order or sequence. Additionally, some of the described method embodiments can occur or be performed at the same point in time.

Figure 5:
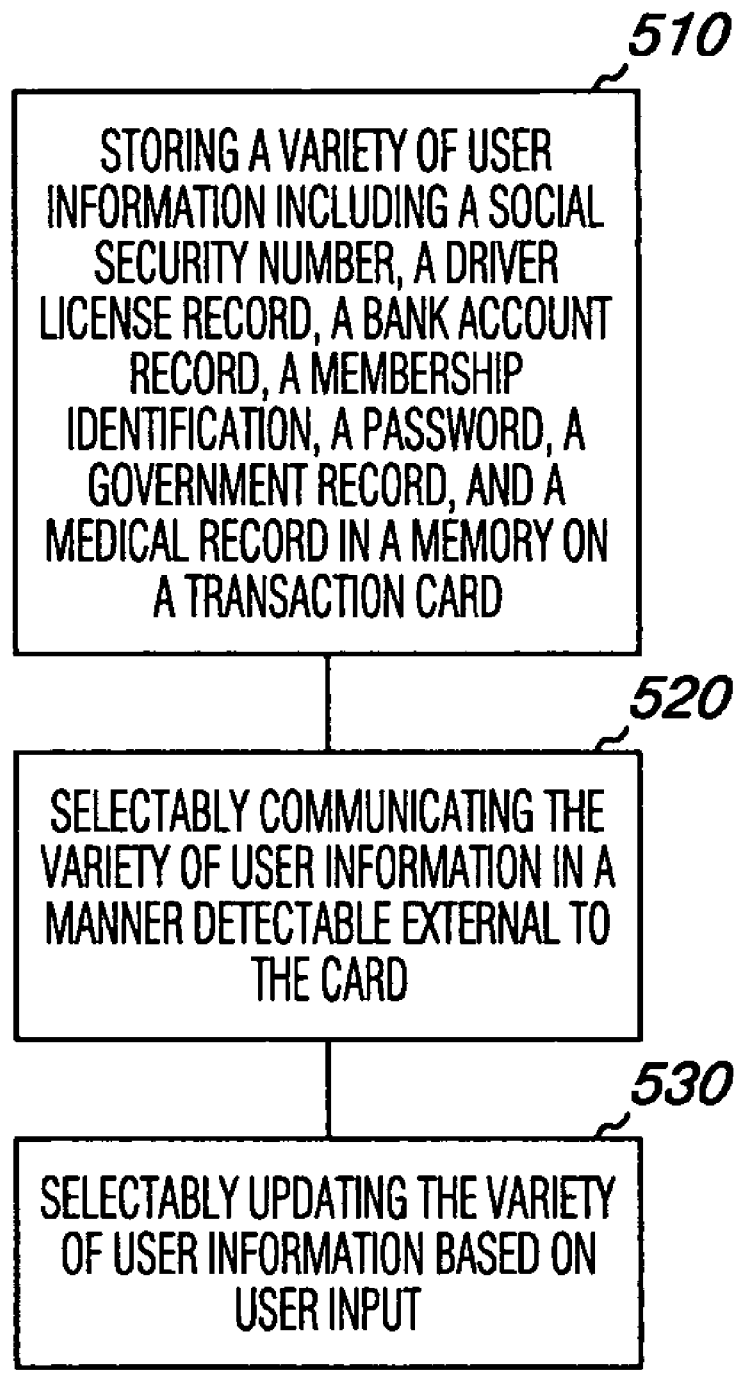
FIG. 5 illustrates a method embodiment for an information card.

FIG. 5 illustrates a method embodiment for an information card. As shown in the embodiment of FIG. 5, the method includes storing a variety of user information including a social security number, a driver license record, and a bank account record in a memory of an information card as shown in block 510. According to various embodiments the method can include storing a membership identification, a password, a government record, and a medical record in a memory of the information card. Embodiments, however, are not limited to the variety of user information provided as examples herein. Program embodiments execute instructions to receive input, e.g., from the user input cluster 230, the data interface 240, the information card interface 250, the RF transceiver 270, the display screen 280, and/or the magnetic stripe reader/writer 290, etc., as described in connection with FIG. 2. For example, a user can execute program instruction embodiments by selecting a file menu on a touch sensitive display screen, e.g., 280, and/or by selecting keys on the user input cluster, e.g., 230, to indicate a type of user information to be entered as well as select a location to store such user information, e.g., government record file 325, a contact record file 326, an identification record file 328, a banking record file 330, a medical record file 332, etc., as described in connection with FIG. 3A. A user can proceed in a similar fashion, e.g., by selecting a file menu on a touch sensitive display screen, e.g., 280, and/or by selecting keys on the user input cluster, e.g., 230, to enter a particular type of user information to the information card.

Additionally, a user can execute program instruction embodiments by selecting a file menu on a touch sensitive display screen, e.g., 280, and/or by selecting keys on the user input cluster, e.g., 230, to indicate and to receive a selectable type of user information via the data interface 240, the information card interface 250, the RF transceiver 270, and/or the magnetic stripe reader/writer 290, etc., and to store such user information in a particular location, e.g., government record file 325, a contact record file 326, an identification record file 328, a banking record file 330, a medical record file 332, etc., as described in connection with FIG. 3A. One of ordinary skill in the art will appreciate upon reading this disclosure the manner in which a selectable type of user information can be received at the data interface 240, the information card interface 250, the RF transceiver 270, over a network connection, e.g., from a financial institution 410, government databank 426, and/or one or more private networks 418 and 422, etc., as illustrated and described in connection with FIG. 4. In this manner, a user can execute program embodiments to selectably store a wide variety of user information within different categories and/or memory files within a memory of the information card, e.g., memory shown as 104 in FIG. 1A and 220 in FIG. 2.

As shown in block 520 the method includes selectably communicating the variety of user information in a manner detectable external to the information card. That is, program embodiments execute instructions upon user input information, entered according to any of the manners described above, to select a particular type of user information, e.g., a social security number, a driver license record, a bank account record, a membership identification, a password, a government record, a medical record, etc., to communicate in a manner detectable external to the information card. Program embodiments further execute instructions based upon such user input information to communicate one or more items of selected user information in a manner detectable external to the information card. For example, user input information can execute the program instructions to display selected user information via the display screen. Likewise, the user input information can execute the program instructions to transmit the selected user information to the data interface, the information card interface, e.g., a magnetic stripe in connection with the magnetic stripe reader/writer, and/or via the RF transceiver.

As one of ordinary skill in the art will appreciate upon reading this disclosure, the program instructions can execute, based on the user input, to further transmit the selected user information from the data interface, the information card interface, and/or the RF transceiver over a network connection, e.g., to a financial institution 410, government databank 426, and/or one or more private networks 418 and 422, etc., as illustrated and described in connection with FIG. 4. In this manner, a user can execute program embodiments to selectably communicate a wide variety of user information within different categories and/or memory files within, but not limited to, a memory of the information card, e.g., from within a particular memory location, e.g., government record file 325, a contact record file 326, an identification record file 328, a banking record file 330, a medical record file 332, etc., as described in connection with FIG. 3A, to any number of destinations detectable external to the information card.

In block 530, the method includes selectably updating the variety of user information based on user input. That is, the various program embodiments execute instructions upon user input information, entered according to any of the manners described above, to select a particular type of user information, e.g., a social security number, a driver license record, a bank account record, a membership identification, a password, a government record, a medical record, etc., to update. As one of ordinary skill in the will appreciate upon reading this disclosure, the update can include changing, adding, and/or deleting selected user information. And, as described above, based on the user input information the user can selectably modify the user information as contained in any of the described memory locations, e.g., within a government record file 325, a contact record file 326, an identification record file 328, a banking record file 330, a medical record file 332, etc., as described in connection with FIG. 3A among others. Program embodiments can further execute instructions based upon such user input information to update, e.g., to place and replace, selected user information on the information card interface 290, e.g., a magnetic stripe, of the information card using the magnetic stripe reader/writer as the same will be known and understood to one of ordinary skill in the art.

Additionally, the program embodiments can execute instructions to update, as described above, selected user information over a network connection, e.g., to a financial institution 410, government databank 426, and/or one or more private networks 418 and 422, etc., as illustrated and described in connection with FIG. 4, via the data interface, the information card interface, and/or via the RF transceiver, for example. Further, the program instructions can execute to display such modifications and/or provide confirmation before, during and/or after user action, e.g., on the display or otherwise. In this manner, a user can execute program embodiments to selectably update a wide variety of user information within different categories and/or memory files within a memory of the information card, e.g., from within a particular memory location, e.g., government record file 325, a contact record file 326, an identification record file 328, a banking record file 330, a medical record file 332, etc., as described in connection with FIG. 3A, and/or at any number of destinations detectable external to the information card. As one of ordinary skill in the art will appreciate upon reading this disclosure, this functionality provides the information card user with wide latitude to manage many diverse pieces of user information of various sensitivity levels, e.g., contact lists, tax records, account information, etc., from a single card. And, the ability to update the variety of user information stored on the card based on user input allows the user to manage what information is stored on the card in consideration of available memory resources thereon.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An information card, comprising;
    a processor within the card;
    a memory within the card and coupled to the processor, wherein the memory includes for a user a variety of user information including social security number, driver license information, and bank account information;
    an input/output (I/O) component, coupled to the memory and processor, to communicate the variety of user information in a manner detectable external to the card;
    a sensor mechanism, coupled to the memory, processor, and I/O component, to provide user authorization and identification, the sensor mechanism including a neural network sensor that detects and compares a human nervous system stimulus of the user; and program instructions stored in the memory and executed by the processor to selectably modify the variety of user information, including updating, editing, and deleting, based on instructions from the user input directly to the card.

2. The card of claim 1, wherein the I/O component includes I/O components selected from the group of:
   a display on the card;
   a function key;
   a transceiver;
   a data port;
   an audio input/output;
   an optical reader;
   a camera; and
   a magnetic stripe.

3. The card of claim 1, wherein the card includes a biometric identification mechanism.

4. The card of claim 1, wherein the processor can execute instructions to enable an information card interface including a microphone.

5. An information card, comprising:
   a processor within the card;
   a memory within the card and coupled to the processor, wherein the memory includes for a user a variety of user information including social security number, driver license information, and bank account information;
   a number of input/output (I/O) components, coupled to the memory and processor, to communicate the variety of user information in a manner detectable external to the card, the number of I/O components including,
   a display;
   a function key;
   a transceiver;
   a data port;
   an audio input/output;
   an optical reader;
   a camera;
   a magnetic stripe;
   program instructions stored in the memory and executed by the processor to selectably modify the variety of user information, including updating, editing, and deleting, based on instructions from the user input directly to the card; and
   a biometric identification mechanism coupled to the processor, the memory, and the I/O components, to provide user authorization and identification, the biometric identification mechanism including a neural network sensor that detects and compares a human nervous system stimulus of the user.

6. The card of claim 5, wherein the function key includes a number of alphanumeric keys and a toggle key to browse menu items presented on the display.

7. The card of claim 5, wherein the display touch sensitive display.

8. The card of claim 5, wherein the transceiver can transmit the variety of user information wirelessly using a communication technology selected from the group of radio frequency (RF) signaling, infra-red (IR) signaling, cellular technology, bluetooth technology, and microwave technology.

9. The card of claim 8, wherein the transceiver communicates the variety of user information with an external device selected from the group of a badge entry check point, a pager device, and a short messaging service (SMS).

10. The card of claim 5, wherein the biometric identification mechanism includes a biometric identification mechanism selected from the group of:
    hand writing on a touch sensitive display;
    voice received on the audio input/output;
    finger print sensor:
    blood analysis DNA sensor;
    an odorant sensor that detects and compares a scent of the user; and
    iris scan.

11. The card of claim 5, wherein the variety of user information further includes:
    a membership identification;
    a password;
    a tax identification; and
    a medical record.

12. The card of claim 5, wherein the memory included instructions to cause the transceiver to transmit and receive the variety of user information with an external device.

13. The card of claim 5, wherein the memory includes instructions executable upon receiving user selectable input to place information relating to a particular item among the variety of user information and the magnetic strip.

14. The card of claim 5, wherein the memory includes instructions executable to update the variety of user information based on input to the number of I/O components.

15. An information card, comprising:
    a processor within the card;
    a memory within the card and coupled to the processor, wherein the memory includes for a user a variety of user information including asocial security number, a driver license record, a band account record, a membership identification, a password, a government record, and a medical record;
    a number of input/output (I/O) components, coupled to the memory and processor
    a sensor mechanism, coupled to the memory, processor, and I/O component, to provide user authorization and identification, the sensor mechanism including a neural network sensor that detects and compares a human nervous system stimulus of the user; and
    program instructions stored in the memory and executed by the processor to selectably modify the variety of user information, including updating, editing, and deleting, based on instructions from the user input directly to the card.

16. The card of claim 15, wherein the card includes component circuitry to connect a display, a function key, a transceiver, an optical sensor, and a magnetic strip on the card.

17. The card of claim 16, wherein the program instructions includes a set of instructions executable in response to input on the number of I/O components.

18. The card of claim 17, wherein the set of instructions are executable to transmit and receive the variety of user information between the card an external device.

19. The card of claim 18, wherein the set of instructions are executable to transmit and receive the variety of user information over a network selected from the group of:
    a wireless network;
    a local area network;
    a wide area network; and
    an internet protocol network.

20. The card of claim 15, further including a biometric identification mechanism on the card selected from the group of:
    a hand writing sensor;
    an audio sensor:
    a blood analysis DNA sensor;
    an odorant sensor that detects and compares a scent of the user; and
    an eye sensor.

21. A computer readable medium having instructions for causing an information card to perform a method, comprising:
- storing for a user a variety of user information including a social security number, a driver license record, a bank account record, a membership identification, a password, a government record, and a medical record in a memory on the card;
- providing user authorization and identification using a sensor mechanism including a neural network sensor that detects and compares a human nervous system stimulus of the user;
- selectably communicating the variety of user information in a manner detectable external to the card; and
- selectably modifying the variety of user information, including updating, editing, and deleting, based on instructions from the user input directly to the card.

22. The medium of claim 21, wherein the method includes selectably updating the variety of user information based on user input to a touch screen display.

23. The medium of claim 21, wherein the method includes wirelessly receiving the variety of user information from information sources external to the information card.

24. A method for use of an information card, comprising:
- storing for a user a variety of user information including a social security number, a driver license record, a bank account record, a membership identification, a password, a government record, an a medical record in a memory on the information card;
- providing user authorization and identification using a sensor mechanism including a neural network sensor that detects and compares a human nervous system stimulus of the user;
- selectably communicating the variety of user information in a manner detectable external to the information card; and
- selectably modifying the variety of user information, including updating, editing, and deleting, based on instruction from the user input directly to the card.

25. The method of claim 24, further including wirelessly transmitting the variety of user information to a device external to the information card.

26. The method of claim 24, further including wirelessly transmitting alert signals in a manner detectable external to the information card.

27. The method of claim 24, further including wirelessly transmitting control signals to a device external to the information card.

28. The method of claim 27, further including wirelessly transmitting control signals to a device selected from the group of:
- a home appliance;
- a lock mechanism; and
- an automobile.

29. The method of claim 24, further including wirelessly receiving the variety of user information from a variety of information sources.

30. The method of claim 29, further including wirelessly receiving the variety of user information from a variety of information sources selected from the group of:
- a banking database;
- a health database;
- a government database;
- an employment database; and
- an internet connection.

* * * * *

UNITED STATES PATENT AND TRADEMARK OFFICE
CERTIFICATE OF CORRECTION

PATENT NO. : 7,472,833 B2
APPLICATION NO. : 10/809151
DATED : January 6, 2009
INVENTOR(S) : Antony Manoj Justin It is certified that error appears in the above-identified patent and that said Letters Patent is hereby corrected as shown below:

In column 16, line 54, in Claim 1, delete "comprising;" and insert -- comprising: --, therefor.

In column 17, line 53, in Claim 7, after "display" insert -- includes --.

In column 18, line 2, in Claim 10, delete "sensor:" and insert -- sensor; --, therefor.

In column 18, line 13, in Claim 12, delete "included" and insert -- includes --, therefor.

In column 18, line 19, in Claim 13, delete "and" and insert -- on --, therefor.

In column 18, line 19, in Claim 13, delete "strip" and insert -- stripe --, therefor.

In column 18, line 27, in Claim 15, delete "asocial" and insert -- a social --, therefor.

In column 18, line 28, in Claim 15, delete "band" and insert -- bank --, therefor.

In column 18, line 32, in Claim 15, delete "processor" and insert -- processor; --, therefor.

In column 18, line 45, in Claim 16, delete "strip" and insert -- stripe --, therefor.

In column 18, line 47, in Claim 17, delete "includes" and insert -- include --, therefor.

In column 18, line 51, in Claim 18, after "card" insert -- and --.

In column 18, line 63, in Claim 20, delete "sensor:" and insert -- sensor; --, therefor.

UNITED STATES PATENT AND TRADEMARK OFFICE
CERTIFICATE OF CORRECTION

PATENT NO. : 7,472,833 B2
APPLICATION NO. : 10/809151
DATED : January 6, 2009
INVENTOR(S) : Antony Manoj Justin It is certified that error appears in the above-identified patent and that said Letters Patent is hereby corrected as shown below:

In column 19, line 29, in Claim 24, delete "an" and insert -- and --, therefor.

Signed and Sealed this

Fifth Day of May, 2009

JOHN DOLL
*Acting Director of the United States Patent and Trademark Office*